(12) United States Patent
Levot

(10) Patent No.: US 7,757,433 B2
(45) Date of Patent: Jul. 20, 2010

(54) SMALL HIVE BEETLE CONTROL HARBOURAGE

(75) Inventor: Garry Levot, Orange (AU)

(73) Assignees: Rural Industries Research & Development Corporation (AU); The Crown in the right of the State of New South Wales (AU)

( * ) Notice: Subject to any disclaimer, the term of this patent is extended or adjusted under 35 U.S.C. 154(b) by 0 days.

(21) Appl. No.: 12/435,095

(22) Filed: May 4, 2009

(65) Prior Publication Data

US 2009/0211149 A1 Aug. 27, 2009

Related U.S. Application Data

(63) Continuation of application No. 11/464,936, filed on Aug. 16, 2006, now abandoned.

(51) Int. Cl.
*A01M 25/00* (2006.01)
(52) U.S. Cl. ............................ 43/121; 43/107; 43/132.1
(58) Field of Classification Search ................... 43/121, 43/107, 131, 132.1, 133
See application file for complete search history.

(56) References Cited

U.S. PATENT DOCUMENTS

| 3,304,646 | A | * | 2/1967 | Staley | 43/131 |
| 3,802,116 | A | * | 4/1974 | Meguro et al. | 43/121 |
| 4,581,845 | A | * | 4/1986 | Burkholder et al. | 43/107 |
| 4,866,877 | A | * | 9/1989 | Barak | 43/121 |
| D310,402 | S | * | 9/1990 | Wyatt et al. | D22/122 |
| 5,157,866 | A | * | 10/1992 | Rosie | 43/121 |
| 5,271,354 | A | * | 12/1993 | Barnett | 119/654 |
| 6,108,965 | A | * | 8/2000 | Burrows et al. | 43/113 |
| 6,618,983 | B1 | * | 9/2003 | Spragins | 43/107 |
| 2008/0041741 | A1 | | 2/2008 | Levot | |

* cited by examiner

*Primary Examiner*—Christopher P Ellis
(74) *Attorney, Agent, or Firm*—Kilpatrick Stockton LLP

(57) ABSTRACT

This invention concerns a Small Hive Beetle control harbourage, that is a passive trap that will naturally attract the beetles to enter it. The harbourage comprises an insecticide treated corrugated cardboard sheet. A shell around the cardboard sheet to prevent access to the sheet. At least one opening in the shell, the opening being sized to allow entry to Small Hive Beetles but to prevent entry by bees, and the opening being arranged relative to the cardboard sheet to allow beetles entering the shell to enter the corrugations in the cardboard.

15 Claims, 2 Drawing Sheets

SMALL HIVE BEETLE CONTROL HARBOURAGE

RELATED APPLICATION

The present application is a continuation of U.S. application Ser. No. 11/464,936 entitled "Small Hive Beetle Control Harbourage" filed Aug. 16, 2006, which is incorporated herein by reference in its entirely.

TECHNICAL FIELD

This invention concerns a Small Hive Beetle control harbourage, that is a passive trap that will naturally attract the beetles to enter it.

BACKGROUND

The South African Small Hive Beetle *Aethina tumida* was introduced into Australia in 2002 and is a pest of honey bees, damaging the comb, brood, honey and exports. The drought has facilitated dispersal of this pest to many parts of Australia and it is no longer possible to eradicate it. As a result it is now necessary to take steps to manage this pest.

DISCLOSURE OF THE INVENTION

The invention is a Small Hive Beetle control harbourage, comprising:

An insecticide treated corrugated cardboard sheet.
A shell around the cardboard sheet to prevent access to the sheet.
At least one opening in the shell, the opening being sized to allow entry to Small Hive Beetles but to prevent entry by bees, and the opening being arranged relative to the cardboard sheet to allow beetles entering the shell to enter the corrugations in the cardboard.
Any insecticide that kills Small Hive Beetles may be used. The insecticide may be selected from one of the following:
Fipronil
Coumaphos
Diazinon
Methonyl
Flumethrin
Imidacloprid
Temephos
Permethrin The cardboard may be core fluted corrugated cardboard having a nominal flute diameter of 4 mm and measuring 3.5 mm from crest to trough.

The cardboard sheet may be dipped in an aqueous solution of insecticide and then air dried. Alternatively, the insecticide may be sprayed onto the cardboard or impregnated into it in any practical fashion.

The shell may be constructed in two parts from dark, preferably opaque black, acrylic plastic. The two parts may clip together with the cardboard sheet inserted between them. Alternatively, glue or plastic welding, (eg. ultrasonic welding,) may be used to fuse the two pieces together. The opening in the shell may be 3 mm+/−0.2 mm to allow entry to the beetles but not the bees.

The cardboard sheet may be positioned within the shell such its edge is set 8 mm back from the opening to prevent bees being able to contact it through the opening.

The cardboard sheet is oriented within the shell such that the open ends of the corrugations are adjacent, but set back from, the opening in the shell.

The shell may have two openings at opposite ends of the harbourage and the corrugations in the cardboard may extend between the two openings; set back from both of them.

The bottom of the shell should be flat so that it sits down flat at the bottom of the hive and the beetles can walk directly into it. Where the bottom of the hive is not flat the harbourage may be stuck down with silicone adhesive such that there are no gaps between the bottom of the hive and the harbourage.

Harbourages made in this fashion will be dark inside and will attract the Small Hive Beetles without the need for any bait. The beetles will enter the shell and then enter the cardboard corrugations. Here they will receive a lethal dose of the insecticide. Trials indicate that use of the harbourages can result in a reduction of up to 90% of the beetles in a hive.

The harbourages may be foil packed in batches of, say, 10 for sale to apiarists. The harbourage will be tamper proof and safe to dispose of with household garbage.

BRIEF DESCRIPTION OF THE DRAWINGS

An example of the invention will now be described with reference to the accompanying drawings, in which.

BEST MODES OF THE INVENTION

Figure 1:
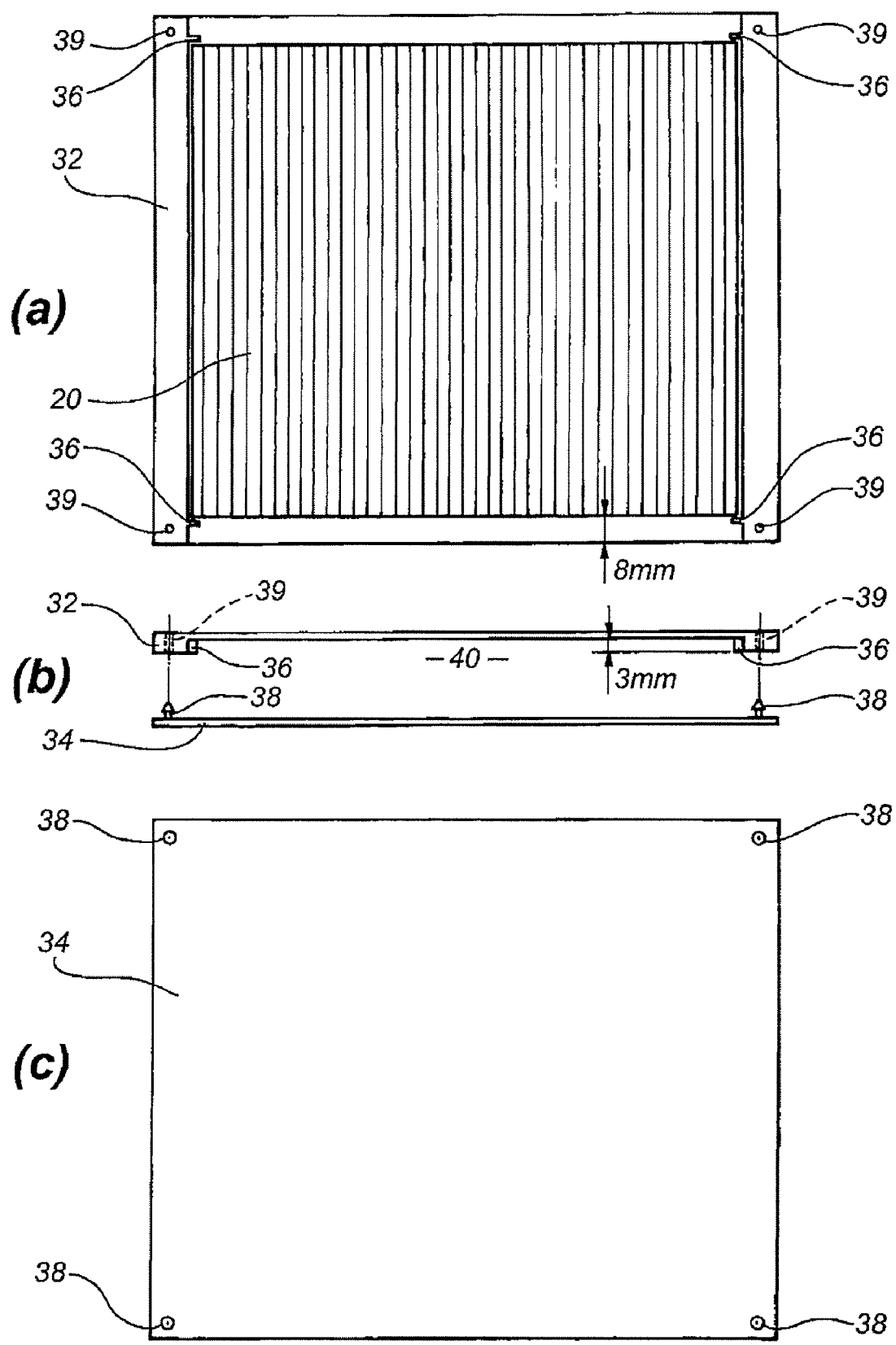
FIG. 1(a) is an inverted plan view of the top of a harbourage; (b) is an exploded elevation showing the top and bottom of the harbourage before they are clipped together; and (c) is a plan view of the bottom of the harbourage.

Referring to all the drawings the harbourage 10 comprises an insecticide treated corrugated cardboard sheet 20, and a shell 30 around the cardboard sheet to prevent access to the sheet. There are two openings 40 in the shell 30. Openings 40 are sized to allow entry to Small Hive Beetles but to prevent entry by bees, and the openings are arranged relative to the cardboard sheet to allow beetles entering the shell to enter the corrugations in the cardboard.

The cardboard sheet 20 is core fluted corrugated cardboard having a nominal flute diameter of 4 mm and measuring 3.5 mm from crest to trough. The cardboard sheet in this example is soaked in a solution of Fipronil 300 ppm and then air dried.

The shell 30 is made from opaque black acrylic, and in this example comprises two essentially flat halves, an upper half 32 and a lower half 34. The upper half 32 is in the form of an inverted "U", and contains internal formations 36 to retain the cardboard sheet 20. When assembled, the shells will be held firmly together. This is achieved in the example by equipping the lower shell 34 with small vertically extending "one way" clips 38 near each corner. The arms of the inverted "U" have small holes 39 drilled near each corner of the upper shell to receive the clips 38 on the lower shell.

A hole (not shown) projecting through one side of the assembled harbourage will accept a length of rigid wire to facilitate placement and removal from the hive with minimal disturbance to the bees.

When the two halves 32 and 34 of the shell are brought together in the proper orientation, with the cardboard sheet inside, projecting clips 38 on the lower half 34 extend into holes 39 where they take grip and prevent the harbourage from being dissembled. The assembled harbourage is 18 cm wide and 15 cm deep. Total thickness of the harbourage is less than 1 cm to fit between the hive bottom board and the frames of comb.

Figure 2:
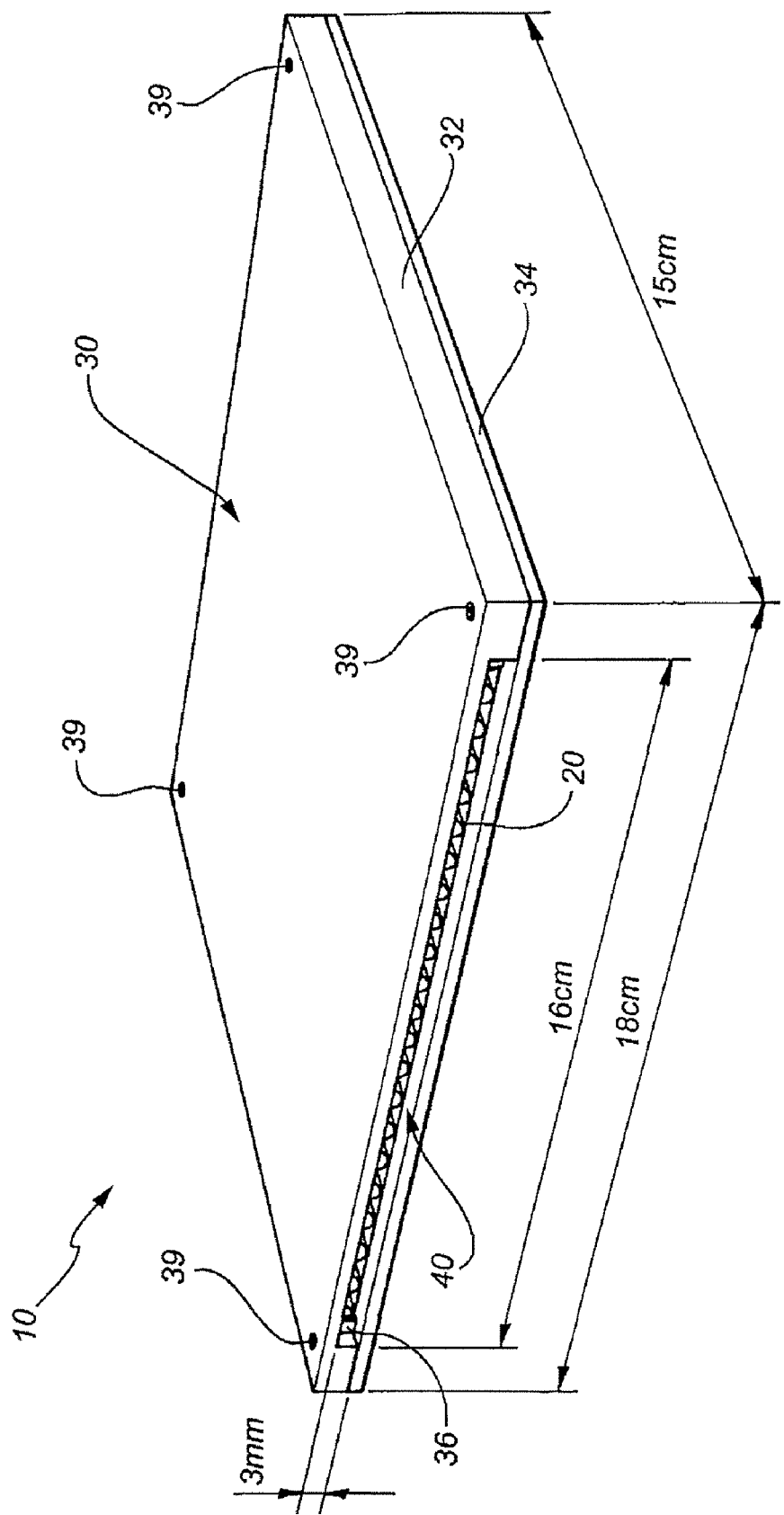
FIG. 2 is a pictorial view of the assembled harbourage.

When the upper and lower halves of the shell are assembled together the resulting harbourage has front and back openings 40 (only the front opening can be seen in FIG. 2). The openings 40 are both in the form of a long straight narrow horizontal slot 3 mm high+/−0.2 mm and 160 mm long to allow entry to the beetles but not the bees.

The cardboard sheet 20 is positioned within the shell such its edge is set 8 mm back from the openings 40 to prevent bees being able to contact it through the opening.

The cardboard sheet 20 is oriented within the shell such that the open ends of the corrugations are adjacent, but set back from, the openings 40 in the shell. The corrugations in the cardboard extend between the two openings 40.

The harbourages may be foil packed in batches of 10 (or more) for sale to apiarists. The harbourage is tamper proof and safe to dispose of with household garbage.

In use the apiarist will open the pack and place one of the harbourages in the bottom of a hive. If the bottom of the hive is not flat the harbourage may be stuck down with silicone adhesive such that there are no gaps between the bottom of the hive and the harbourage.

The harbourages are dark inside and attract the Small Hive Beetles as a suitable residence without the need for any bait. The beetles will enter the shell and then enter the cardboard corrugations where they will receive a lethal dose of insecticide.

Although the invention has been described with reference to a particular example, it should be appreciated that it could be exemplified in many other forms and in combination with other features not mentioned above. For instance, many other methods of manufacture and assembly may be employed.

What is claimed is:

1. A Small Hive Beetle control harbourage, comprising:
   an insecticide treated corrugated cardboard sheet having a plurality of corrugations;
   a shell around the cardboard sheet to prevent access to the sheet;
   at least one opening in the shell, the opening having a perimeter and being sized to allow entry to Small Hive Beetles but to prevent entry by bees, and the opening being arranged relative to the cardboard sheet to allow beetles entering the shell to enter the corrugations in the cardboard, wherein the cardboard sheet is positioned within the shell such that an edge of the cardboard sheet is set back from the entire perimeter of the opening a distance to prevent bees from being able to contact the cardboard sheet using smaller body parts of the bees through the perimeter of the opening without having to enter the opening.

2. A harbourage according to claim 1, wherein the insecticide is selected from a group consisting of:
   Fipronil;
   Coumaphos;
   Diazinon;
   Methonyl;
   Flumethrin;
   Permethrin;
   Imidacloprid; and,
   Temephos.

3. A harbourage according to claim 1, wherein the cardboard sheet is core fluted corrugated cardboard having a nominal flute diameter of 4 mm and measuring 3.5 mm from crest to trough.

4. A harbourage according to claim 2, wherein the cardboard sheet is dipped in an aqueous solution of insecticide and then air dried.

5. A harbourage according to claim 1, wherein the insecticide is sprayed onto the cardboard sheet.

6. A harbourage according to claim 1, wherein the insecticide is impregnated into the cardboard sheet.

7. A harbourage according to claim 1, wherein the shell is constructed in two parts from dark, opaque, acrylic plastic.

8. A harbourage according to claim 7, wherein the two parts of the shell clip together with the cardboard insert between them.

9. A harbourage according to claim 1, wherein the at least one opening in the shell is in the form of a straight, narrow slot 3 mm+/−0.2 mm high to allow entry to the beetles but not the bees.

10. A harbourage according to claim 1, wherein the cardboard is positioned within the shell such that the edge of the cardboard is set 8 mm back from the at least one opening.

11. A harbourage according to claim 1, wherein the cardboard is oriented within the shell such that open ends of the corrugations are adjacent, but set back from, the at least one opening in the shell.

12. A harbourage according to claim 1, wherein the shell has two openings at opposite ends of the harbourage and the corrugations in the cardboard extend between the two openings, set back from both of the two openings.

13. A harbourage according to claim 1, wherein the bottom of the shell is flat so that it sits down flat at the bottom of a hive and the beetles can walk directly into it.

14. A harbourage according to claim 1, wherein the harbourage is tamper proof and safe to dispose of with household garbage.

15. A foil wrapped pack containing more than one of the harbourages according to claim 1.

\* \* \* \* \*